W. H. RUNGE.
SPEED CHANGING MECHANISM.
APPLICATION FILED MAY 11, 1917.
1,285,399.
Patented Nov. 19, 1918.
3 SHEETS—SHEET 1.
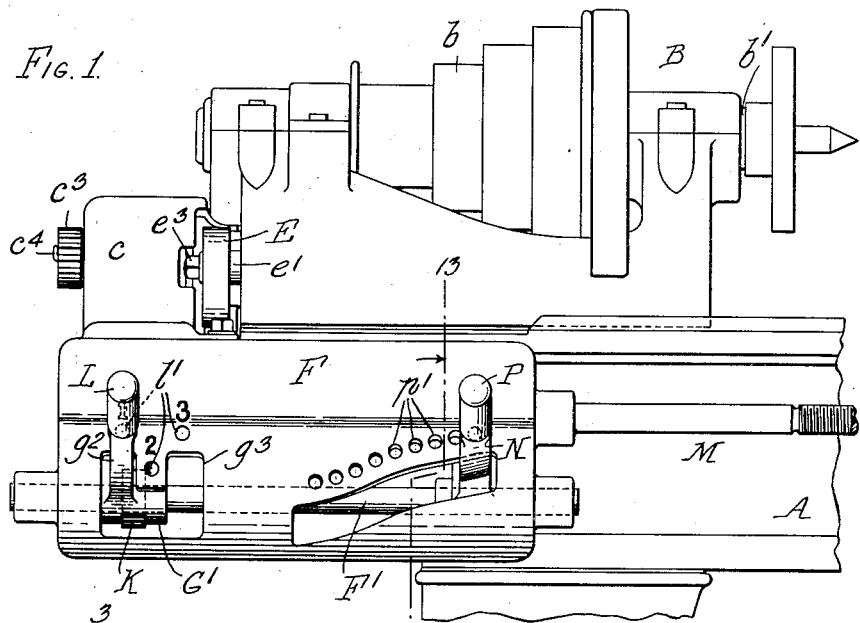
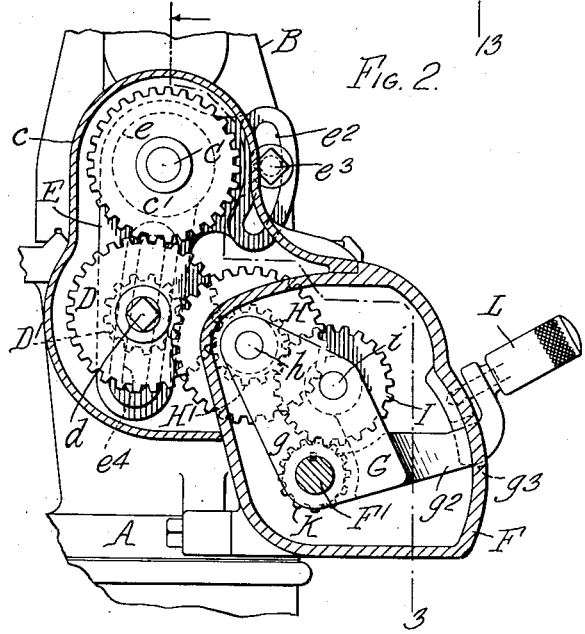
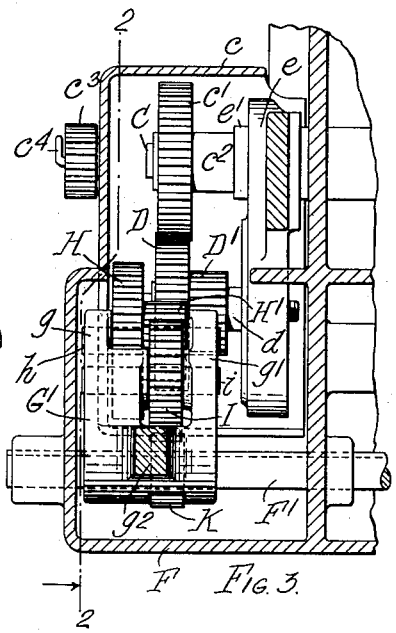
INVENTOR.
William H. Runge.
By Wilhelm & Parker.
ATTORNEYS.

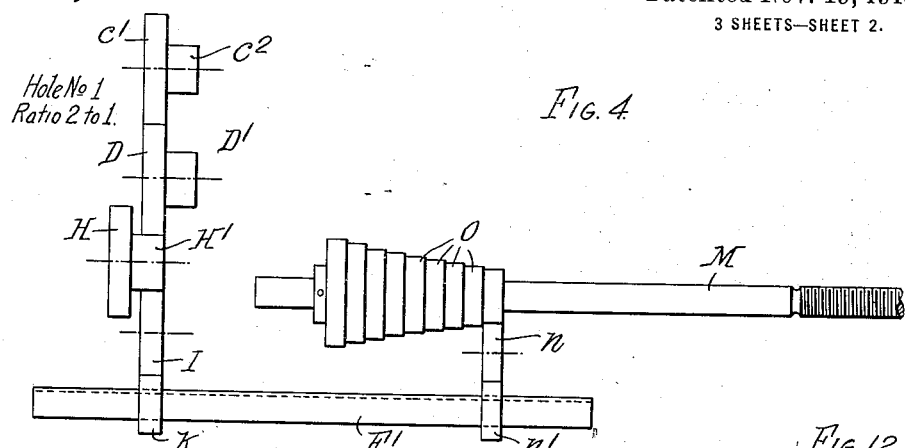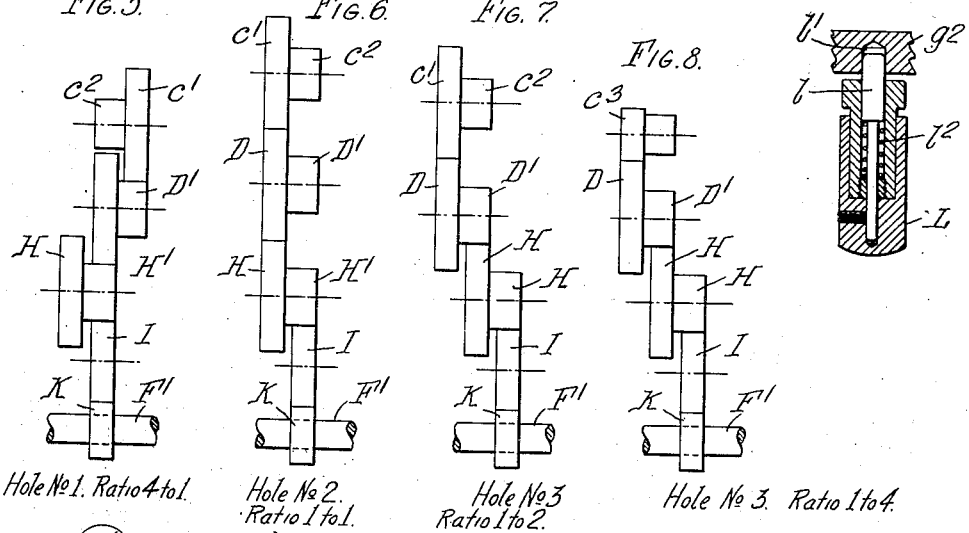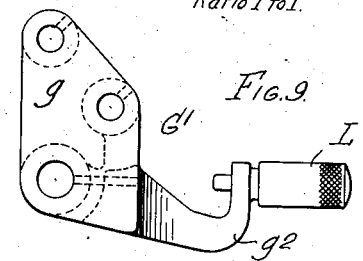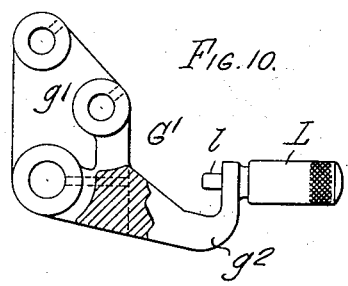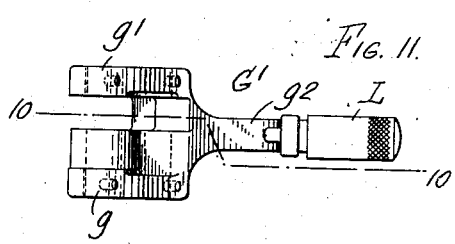

W. H. RUNGE.
SPEED CHANGING MECHANISM.
APPLICATION FILED MAY 11, 1917.
1,285,399.
Patented Nov. 19, 1918.
3 SHEETS—SHEET 3.
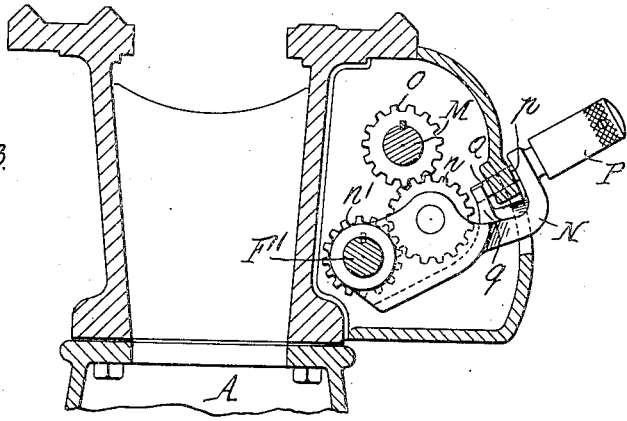
Fig. 13.
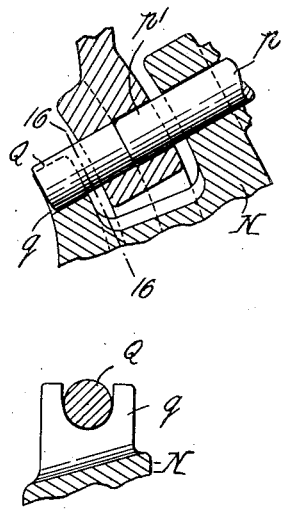
Fig. 15.
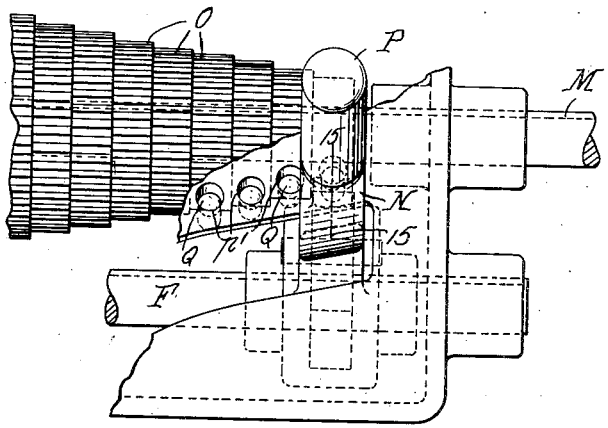
Fig. 14.
Fig. 16.
INVENTOR
William H. Runge
by Wilhelm & Parker
ATTORNEYS.

UNITED STATES PATENT OFFICE.

WILLIAM H. RUNGE, OF SENECA FALLS, NEW YORK, ASSIGNOR TO THE SENECA FALLS MANUFACTURING COMPANY, OF SENECA FALLS, NEW YORK.

SPEED-CHANGING MECHANISM.

1,285,399.   Specification of Letters Patent.   Patented Nov. 19, 1918.

Application filed May 11, 1917. Serial No. 167,898.

*To all whom it may concern:*

Be it known that I, WILLIAM H. RUNGE, a citizen of the United States, residing at Seneca Falls, in the county of Seneca and State of New York, have invented a new and useful Improvement in Speed-Changing Mechanisms, of which the following is a specification.

This invention relates to speed changing mechanism of the general type commonly employed on lathes for producing different relative speeds of rotation of the lathe spindle and the feed screw.

The objects of the invention are to provide a simplified and improved mechanism of this kind in which a plurality of gears are mounted on a gear shift lever or tumbler and adapted to be moved into engagement with gears rotating about relatively fixed axes, the arrangement of the parts being such as to reduce the number of intermediate shafts heretofore required to obtain the desired speed ratios; also to provide means of improved construction for guiding the cone gear lever or tumbler to insure a proper meshing of the gears; also to improve the construction of speed changing mechanisms of this kind in other respects hereinafter specified.

In the accompanying drawings:

Figure 1 is a fragmentary front elevation of a lathe provided with the improvements embodying the invention.

Fig. 2 is a fragmentary transverse sectional elevation thereof, on an enlarged scale, on line 2—2, Fig. 3.

Fig. 3 is a sectional front elevation thereof, on line 3—3, Fig. 2.

Fig. 4 is a diagrammatic view of a part of the gearing connecting the lathe spindle and the lead screw.

Figs. 5–8 inclusive are diagrammatic views of a part of this gearing showing different positions of the gears to obtain different speed ratios.

Fig. 9 is a side elevation of the compound tumbler or gear shift lever detached from the machine.

Fig. 10 is a sectional elevation thereof on line 10—10, Fig. 11.

Fig. 11 is a top plan view thereof.

Fig. 12 is a sectional elevation, on an enlarged scale, of the handle or knob of the speed change lever.

Fig. 13 is a transverse sectional elevation of the head end of the lathe on line 13—13, Fig. 1, showing the means embodying the invention for guiding the train gear lever or tumbler into its operative positions.

Fig. 14 is a fragmentary front elevation thereof, on an enlarged scale.

Fig. 15 is a fragmentary sectional elevation thereof, on a still larger scale, on line 15—15, Fig. 14.

Fig. 16 is a fragmentary section thereof on line 16—16, Fig. 15.

A represents the usual lathe bed having a head stock B of any suitable construction mounted thereon, including a cone pulley $b$ through which power is transmitted to the lathe, and which is preferably mounted on the lathe spindle $b'$. The lathe spindle is connected through gearing of any suitable kind (not shown) with a rotary feed stud or shaft C rotating in a removable gear case or housing $c$. The feed stud C is provided with the usual change gear $c'$ removably mounted on the feed stud and having a boss or sleeve portion $c^2$ which enables this gear to be removed from the feed stud and reversed, so that either the gear $c'$ or the sleeve portion $c^2$ may be adjacent to the outer end of the feed stud. The change gear $c'$ may be removed from the stud and replaced by an alternate gear $c^3$, which when not in use is suspended on a hook $c^4$ on the outer portion of the removable housing $c$. All of these parts have heretofore been employed in change speed mechanisms of this kind and of themselves constitute no part of this invention.

The change gear $c'$ when arranged adjacent to the outer end of the feed stud C, as shown in Fig. 3, is adapted to mesh with an intermediate gear D, and when in the reversed position, in which the collar $c^2$ is arranged adjacent to the outer portion of the feed stud, is adapted to mesh with a smaller intermediate gear D', the gears D D' being suitably secured together and rotatably mounted on a stud $d$. The intermediate gears are arranged to be adjusted relatively to the rotary feed stud C so that either of these gears may be placed into mesh with the change gear $c'$ when in either of its positions or with the alternate gear $c^3$ when this gear is secured on the feed stud. For this purpose the stud $d$ carrying the intermediate gears D D' is adjustably mounted on a yoke or bracket E, which, in turn, is preferably adjustably secured on the headstock B. In the construction shown, this yoke or bracket is adapted to be adjusted about the axis of the feed stud C, being for this purpose provided with a bearing portion $e$ journaled on a sleeve or collar $e'$ concentric with the rotary feed stud C. The yoke or bracket E is provided with an arc-shaped slot $e^2$ through which a set screw $e^3$ passes which is adapted to clamp the yoke E against movement relatively to the head-stock B. The yoke or bracket E is also provided with a slot $e^4$ in which the stud $d$ may be adjustably secured to vary the position of the intermediate gears D D' relatively to the rotary feed stud C. Any other means may be employed for adjusting the position of the intermediate gears.

Power is transmitted from either of the intermediate gears D D' to a tumbler shaft F', suitably journaled in a gear case F arranged on the head stock of the lathe, by means of a series of gears mounted on a compound gear shift lever or tumbler G. In the construction shown, this gear shift lever or tumbler is pivoted on the tumbler shaft F' and adapted to slide lengthwise thereon, and has two arms $g$ and $g'$ carrying shift gears H H' rotatably mounted on a pin $h$ secured in the arms $g$ $g'$. Either of the gears H H' is adapted to be moved into mesh with one or another of the intermediate gears D D', and a gear I is mounted on a pin $i$ connecting the arms $g$ $g'$ of the lever G and meshes with the shift gear H' and with a gear K arranged between the arms $g$ $g'$ and splined to the tumbler shaft. The compound lever G also has an arm $g^2$ extending outwardly through a slot or opening $g^3$ in the gear housing and adapted to be shifted to place one or another of the shift gears H H' into mesh with one or another of the gears D D'.

The compound lever or tumbler G shown in the drawings is adapted to occupy three positions. In the first position, shown in Figs. 1-5, the gear H' meshes with the gear D; in the second or intermediate position, Fig. 6, the gear H meshes with the gear D; and in the third position, Figs. 7 and 8, the gear H meshes with the gear D'. By means of this arrangement three speeds of the tumbler shaft F' can be obtained by merely shifting the compound lever G. For each of these positions of the lever G a number of different speeds can be obtained by changing the position of the change gear $c'$ on the feed stud or replacing this gear by the alternate gear $c^3$. Figs. 4 and 5, for example, show diagrammatically the arrangement of the gears when the compound lever G is in the extreme left position, in which position it is shown in Figs. 1 and 3, Fig. 4 showing the change gear $c'$ at the outer portion of the feed stud C, and Fig. 5 showing this change gear reversed. Figs. 7 and 8 show the positions of the gears when the compound lever is in the extreme right-hand position, Fig. 7 showing the change gear $c'$ in the position shown in Fig. 3, and Fig. 8 showing the alternate gear $c^3$ in place on the feed stud C.

Any suitable means may be provided for holding the compound lever G in any of its three positions. In the construction shown, the outer end of the lever G is provided with a handle or knob L having a stud or pin $l$. Fig. 12, connected therewith and adapted to engage in any one of three holes $l'$ in the gear housing F, the handle L being yieldingly pressed by a spring $l^2$ into engagement in one of the holes $l'$.

The tumbler shaft F' is adapted to be connected with the lead screw M of the lathe by suitable means for varying the speeds of the lead screw relatively to the tumbler shaft, such as a cone gear lever or tumbler N of the kind commonly employed for this purpose which is movable lengthwise of the tumbler shaft F' and is provided with a gear $n$ meshing with a gear $n'$ splined on the tumbler shaft F'. The gear $n$ is adapted to be moved into operative engagement with any one of a series of gears O forming a gear cone and mounted on the lead screw M, and is adapted to be held in this position by means of a handle or knob P on the lever N which may, if desired, be similar in construction to the knob or handle L and which is provided with a pin $p$, adapted to enter into any one of a number of holes $p'$ in the housing F.

Means are preferably provided for properly guiding the gear $n$ into mesh with the corresponding gear O of the gear cone. In the construction shown for this purpose the holes $p'$ are drilled through the wall of the gear casing F and pins Q are secured in the inner portions of these holes and project inwardly from the wall of the gear casing. The cone gear lever N is provided with a bifurcated portion $q$ adapted to straddle the pins Q when the lever N is being moved into one or another of its operative positions. The projecting portions of the bifurcated portion $q$ prevent the lever from being moved to one side or another of its operative positions so that the gear $n$ cannot be moved into improper relation to any of the gears O of the gear cone, and the danger of breaking off the corners of the teeth of the gears O and $n$ is eliminated.

By means of the arrangement of the change speed lever G and the gears coöperating therewith, a quickly adjustable mechanism is produced, which is simple and inexpensive in construction. The means for guiding the cone lever or tumbler into operative position also is inexpensive to manufacture and thoroughly reliable in action. By means of the combination of the cone gear lever N and the compound tumbler or gear shift lever G, a great variety of different relative speeds between the lathe spindle and the lead screw can be obtained.

I claim as my invention:

1. The combination with a lathe spindle, a lead screw, and an intermediate gear driven from said spindle, of a tumbler shaft through which power is transmitted to the lead screw, a lever having a plurality of shift gears mounted thereon, said lever being slidably mounted on said shaft to place any of the gears mounted thereon into mesh with said intermediate gear, and a gear splined to said shaft and movable with said lever and driven by said shift gears.

2. The combination with a lathe spindle, a lead screw, and intermediate gears driven from said spindle, of a tumbler shaft, means for transmitting power from said tumbler shaft to the lead screw, a lever having a shift gear mounted thereon, said lever being slidably mounted on said tumbler shaft to place said shift gear into mesh with any of said intermediate gears, and a gear splined to said tumbler shaft and movable with said lever and driven by said shift gear for transmitting power from said shift gear to said tumbler shaft.

3. The combination with a lathe spindle, a lead screw, and intermediate gears driven from said spindle, of a tumbler shaft through which power is transmitted to the lead screw, a lever having a plurality of shift gears mounted thereon, said lever being slidably mounted on said shaft to place any of said shift gears into engagement with any of said intermediate gears, and a gear splined to said shaft and movable with said lever and driven by said shift gear.

4. The combination with a lathe spindle, a lead screw, and intermediate gears driven from said spindle, of a tumbler shaft through which power is transmitted to the lead screw, a lever having a plurality of shift gears mounted thereon, said lever being slidably mounted on said shaft to place any of said shift gears into engagement with any of said intermediate gears, a gear splined to said shaft and movable with said lever, and an intermediate gear meshing with said splined gear and with one of said shift gears for transmitting power from said shift gears to said tumbler shaft.

5. The combination of a lathe spindle, an intermediate gear driven from said lathe spindle, a lead screw, a set of cone gears on said lead screw, and a tumbler shaft through which power is transmitted to said cone gears, of a lever having a plurality of shift gears mounted thereon and slidably mounted on said tumbler shaft to place any of said shift gears into mesh with said intermediate gear, and a gear splined to said tumbler shaft and driven by the gears mounted on said lever.

6. The combination of a lathe spindle, a lead screw, a rotary feed stud driven from said lathe spindle, a change gear mounted on said feed stud and adapted to be held in one or another position on said feed stud, a plurality of intermediate gears one or another of which is adapted to mesh with said change gear, a yoke on which said intermediate gears are mounted, means for adjusting said yoke about said feed stud, a tumbler shaft through which power is transmitted to said lead screw, a lever slidably mounted on said tumbler shaft and having a plurality of shift gears mounted thereon and adapted to be moved into mesh with one or another of said intermediate gears, and means connected with said lever for driving said tumbler shaft from said shift gears.

7. The combination of a lathe spindle, a lead screw, a rotary feed stud driven from said lathe spindle, a change gear mounted on said feed stud and adapted to be held in one or another position on said feed stud, a plurality of intermediate gears one or another of which is adapted to mesh with said change gear, a yoke on which said intermediate gears are mounted, said yoke being pivoted to swing about the axis of said feed stud, means for securing the yoke in an adjusted position, means for adjustably securing said intermediate gears on said yoke, means for adjusting said yoke about said feed stud, a tumbler shaft through which power is transmitted to said lead screw, a lever slidably mounted on said tumbler shaft and having a plurality of shift gears mounted thereon and adapted to be moved into mesh with one or another of said intermediate gears, and means connected with said lever for driving said tumbler shaft from said shift gears.

8. In a lathe, the combination with a lead screw, a gear cone mounted thereon, and a tumbler shaft through which power may be transmitted to said gear cone, of a lever slidable on said tumbler shaft, a gear mounted on said lever and adapted to be moved into engagement with one or another of the gears of said gear cone, said gear being driven from said tumbler shaft, a casing inclosing said gears and provided with means for holding said lever in operative relation to any of the gears of said gear cone, inwardly extending projections on said casing, and a bifuracted part on said lever adapted to straddle said projections to guide said lever into proper operative relation to any of the gears of said gear cone.

9. In a lathe, the combination with a lead screw, a gear cone mounted thereon, and a tumbler shaft through which power may be transmitted to said gear cone, of a lever slidable on said tumbler shaft, a gear mounted on said lever and adapted to be moved into engagement with one or another of the gears of said gear cone, said gear being driven from said tumbler shaft, a casing for said gears, said casing being provided with holes, a part on said lever adapted to engage in said holes for holding the lever in operative relation to any of the gears of said gear cone, a pin secured in each of said holes and projecting beyond the surface of said casing, and a part on said lever adapted to straddle any one of said pins for guiding the lever into proper operative relation to any of the gears of said gear cone.

Witness my hand, this 4th day of May, 1917.

WILLIAM H. RUNGE.

Witnesses:
ADELBERT S. DAVIS,
B. J. GORDON.